(12) United States Patent
Hall et al.

(10) Patent No.: US 11,220,134 B1
(45) Date of Patent: Jan. 11, 2022

(54) MODULAR TIRE LIFTING ASSEMBLY

(71) Applicants: Ronald Hall, West Valley City, UT (US); Anthony Willis, West Valley City, UT (US)

(72) Inventors: Ronald Hall, West Valley City, UT (US); Anthony Willis, West Valley City, UT (US)

( * ) Notice: Subject to any disclaimer, the term of this patent is extended or adjusted under 35 U.S.C. 154(b) by 0 days.

(21) Appl. No.: 17/088,992

(22) Filed: Nov. 4, 2020

(51) Int. Cl.
*B60B 30/02* (2006.01)
*B60B 29/00* (2006.01)

(52) U.S. Cl.
CPC ............ *B60B 29/001* (2013.01); *B60B 30/02* (2013.01); *B60B 2900/541* (2013.01)

(58) Field of Classification Search
CPC .. B60B 29/001; B60B 30/02; B60B 2900/541
USPC ..................................... 294/57, 58
See application file for complete search history.

(56) References Cited

U.S. PATENT DOCUMENTS

| | | | |
|---|---|---|---|
| 3,378,154 A | 4/1968 | Mousel | |
| 3,976,212 A | 8/1976 | Sanchez | |
| 4,050,728 A * | 9/1977 | Davidson | A01B 1/026 294/58 |
| 5,176,487 A | 1/1993 | Flitton | |
| 5,356,163 A * | 10/1994 | Suggs, Sr. | B60B 29/002 280/47.24 |
| D368,416 S * | 4/1996 | Holman | D8/14 |
| 5,562,389 A | 10/1996 | Mitchell | |
| 5,897,151 A * | 4/1999 | Horvat | B25G 3/24 294/57 |
| 5,921,600 A * | 7/1999 | Lucas | A01B 1/026 294/58 |
| 6,003,915 A * | 12/1999 | Bierman | E01H 5/02 280/823 |
| D589,224 S | 3/2009 | Kilpatrick | |
| 7,740,439 B1 | 6/2010 | Browning | |
| 8,118,281 B1 | 2/2012 | Nolan | |
| 8,322,764 B2 * | 12/2012 | Miller | B25G 3/12 294/51 |
| 8,720,522 B2 * | 5/2014 | Combs | B60B 29/001 157/1.1 |
| 8,960,743 B1 * | 2/2015 | Hasenjaeger | B25G 1/04 294/51 |
| 2014/0159401 A1 * | 6/2014 | Hajek | F16C 11/04 294/58 |

FOREIGN PATENT DOCUMENTS

WO    WO2016197241    12/2016

* cited by examiner

*Primary Examiner* — Jonathan Snelting

(57) ABSTRACT

A modular tire lifting assembly includes a yoke that has a pair of arms which are spaced apart from each other such that t a vehicle tire can be positioned between the pair of arms. The yoke is comprised of a plurality of modular sections such that the yoke can be disassembled for storage in a vehicle. A first handle and a second handle are provided and either can be removably attachable to the yoke. Either the first handle or the second handle angles upwardly from the yoke when removably attached to the yoke thereby facilitating the yoke to lift the vehicle tire when either the first handle or the second handle is urged downwardly. Additionally, the second handle has a length that is less than a length of the first handle.

10 Claims, 5 Drawing Sheets

MODULAR TIRE LIFTING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to tire lifting devices and more particularly pertains to a new tire lifting device for lifting a vehicle tire to be mounted on a vehicle.

(2) Description of Related Art Including Information Disclosed Under 37 CFR 1.97 and 1.98

The prior art relates to tire lifting devices including a variety of tire lifting yokes that each at least includes a pair of rollers for engaging a vehicle tire. The prior art also discloses a variety of tire lifting racks that can be tilted to lift a vehicle tire to mount on a vehicle. The prior art discloses a tire lifting yoke that includes a sling for supporting a vehicle tire.

BRIEF SUMMARY OF THE INVENTION

An embodiment of the disclosure meets the needs presented above by generally comprising a yoke that has a pair of arms which are spaced apart from each other such that a vehicle tire can be positioned between the pair of arms. The yoke is comprised of a plurality of modular sections such that the yoke can be disassembled for storage in a vehicle. A first handle and a second handle are provided and either can be removably attachable to the yoke. Either the first handle or the second handle angles upwardly from the yoke when removably attached to the yoke thereby facilitating the yoke to lift the vehicle tire when either the first handle or the second handle is urged downwardly. Additionally, the second handle has a length that is less than a length of the first handle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
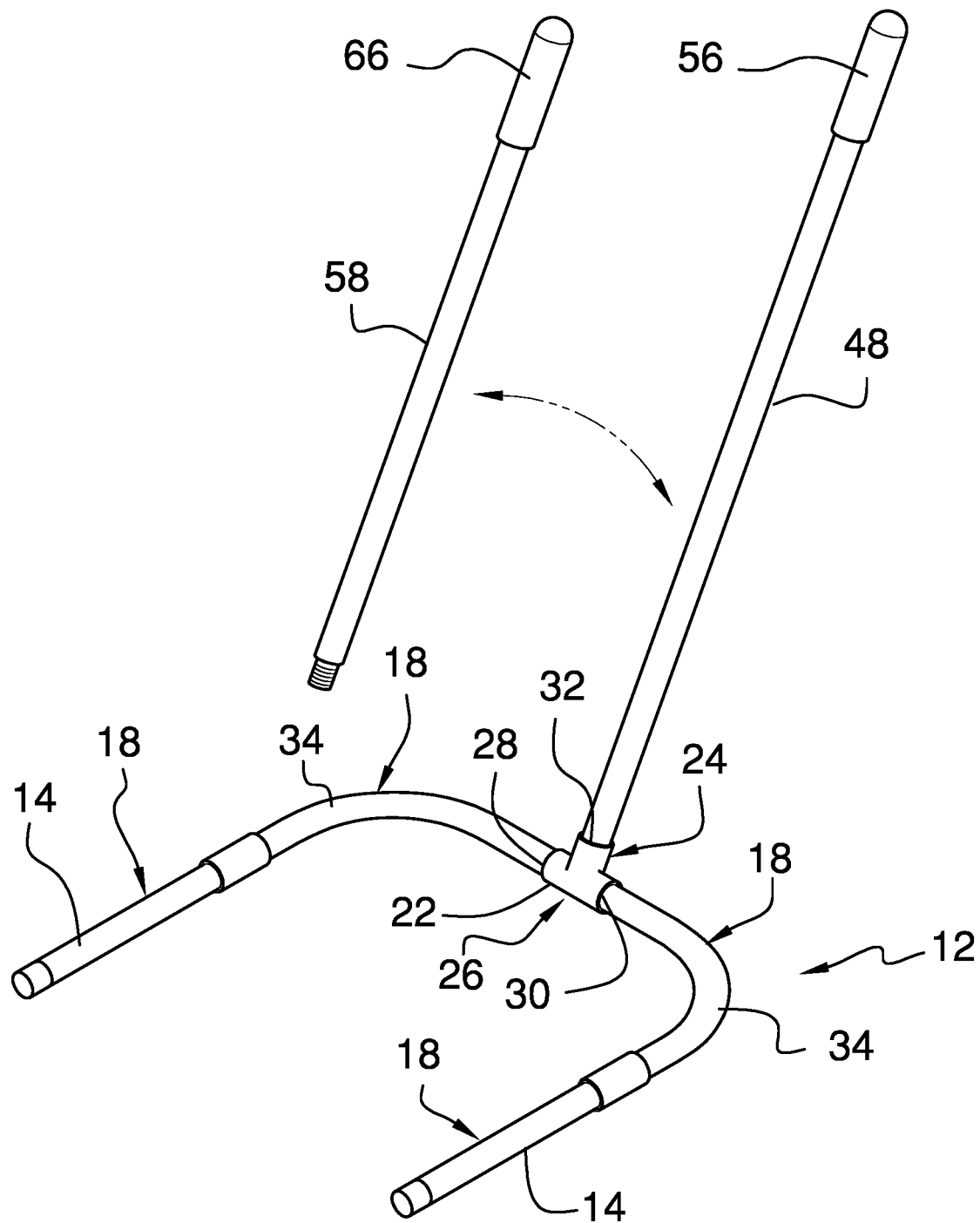
FIG. 1 is a perspective view of a modular tire lifting assembly according to an embodiment of the disclosure.
Figure 2:
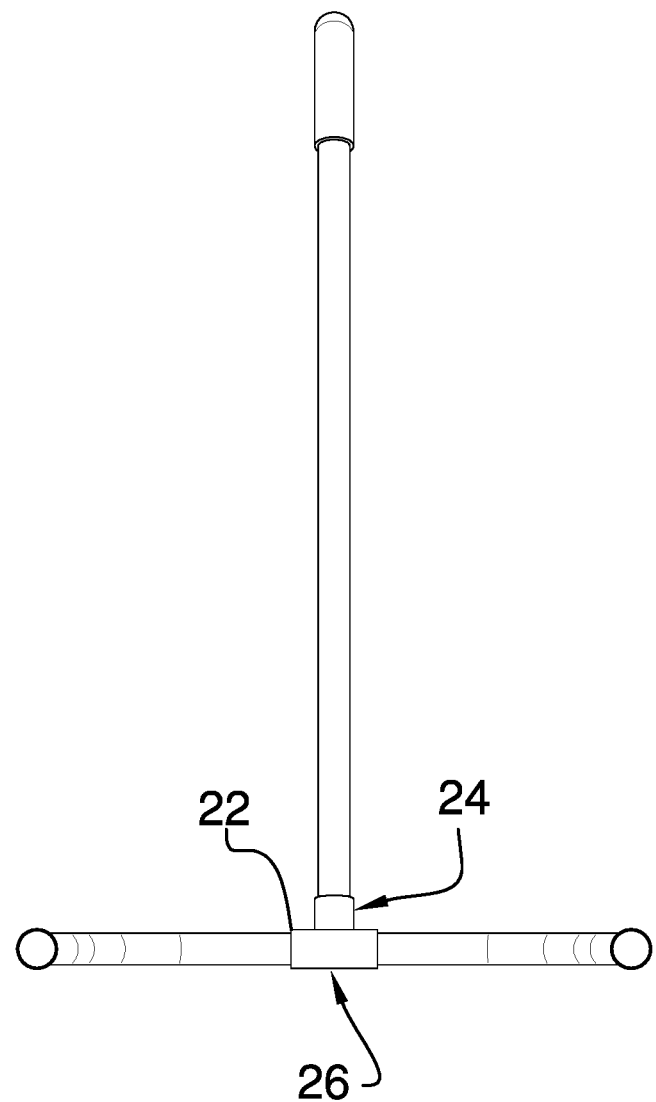
FIG. 2 is a front view of an embodiment of the disclosure.
Figure 3:
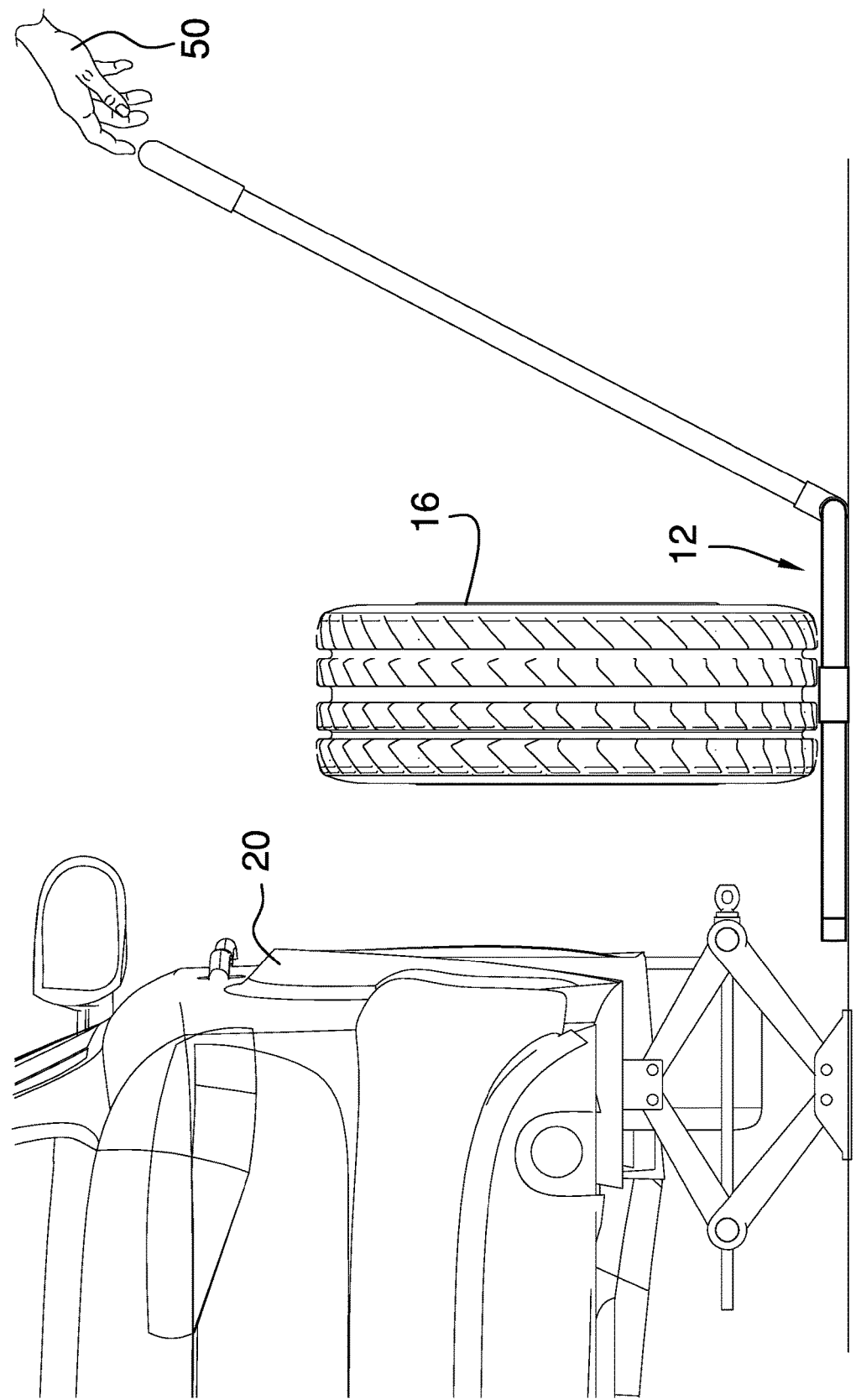
FIG. 3 is a perspective in-use view of an embodiment of the disclosure.
Figure 4:
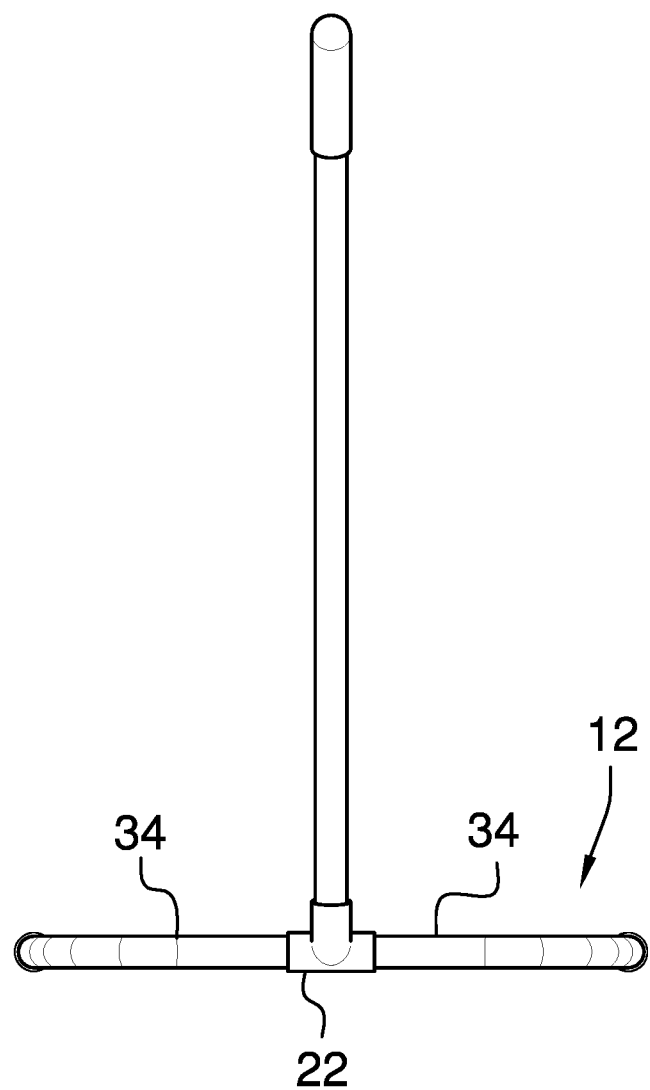
FIG. 4 is a back view of an embodiment of the disclosure.
Figure 5:
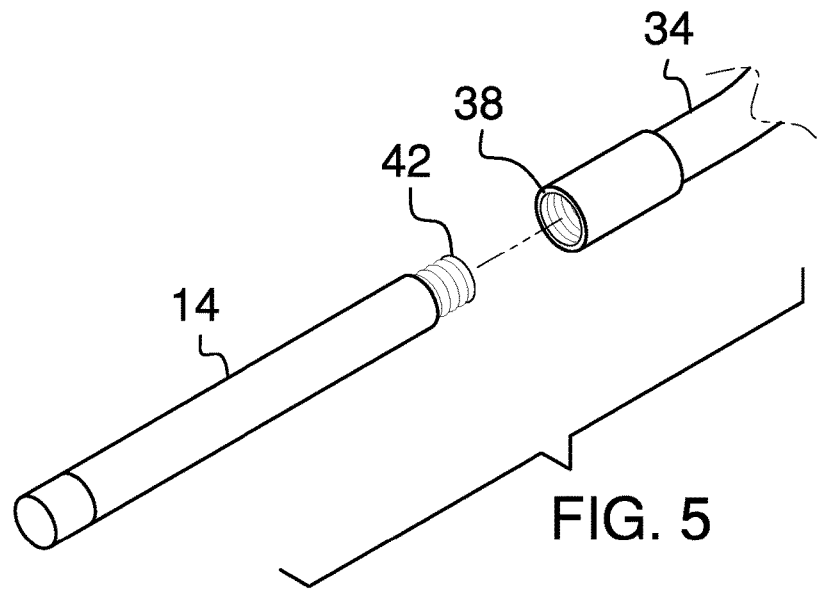
FIG. 5 is a detail view of an arm and a curved member of an embodiment of the disclosure.
Figure 6:
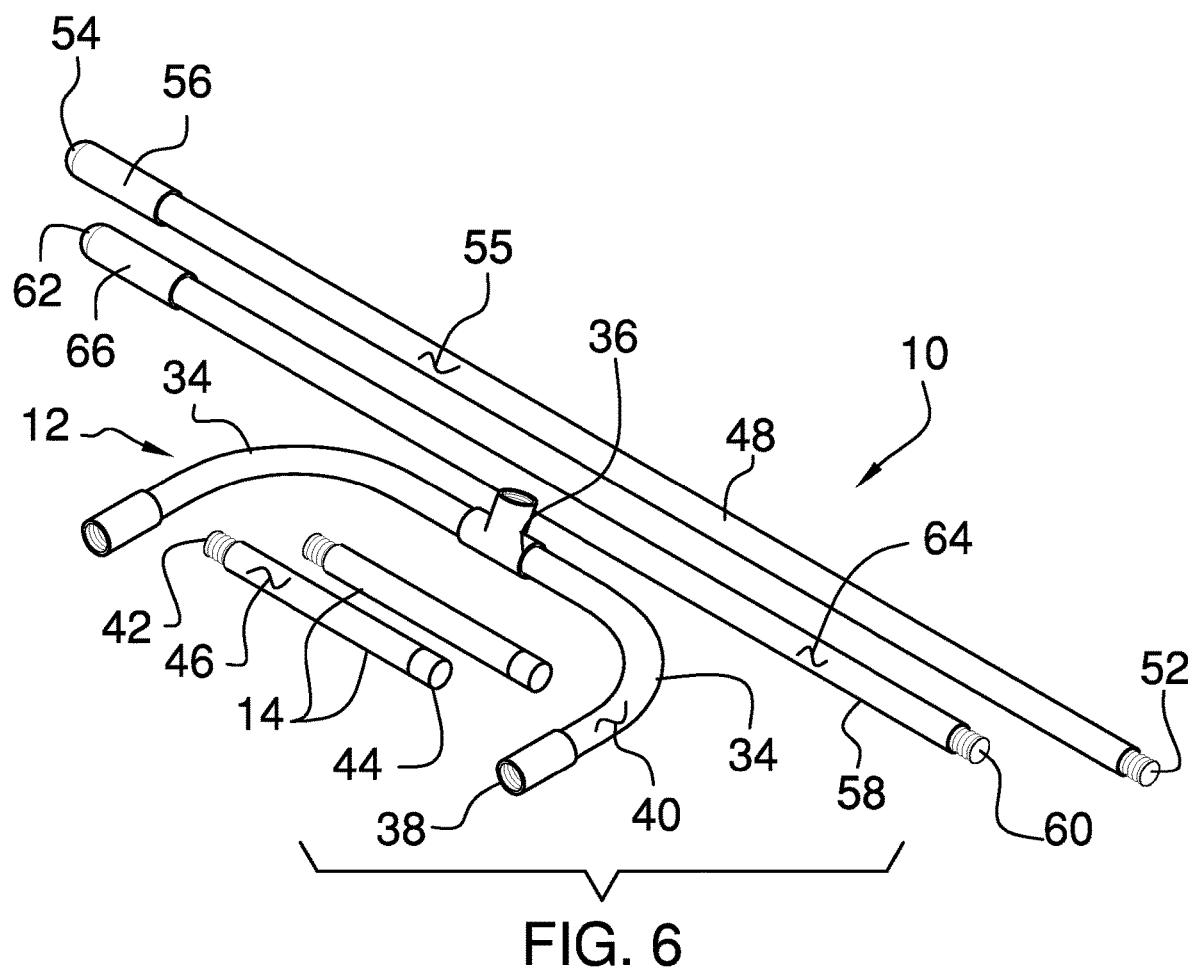
FIG. 6 is a perspective view of an embodiment of the disclosure showing a yoke being disassembled.

With reference now to the drawings, and in particular to FIGS. 1 through 6 thereof, a new tire lifting device embodying the principles and concepts of an embodiment of the disclosure and generally designated by the reference numeral 10 will be described.

As best illustrated in FIGS. 1 through 6, the modular tire lifting assembly 10 generally comprises a yoke 12 that has a pair of arms 14 that are spaced apart from each other to facilitate a vehicle tire 16 to be positioned between the pair of arms 14. The vehicle tire 16 may be a tubeless tire that is common to motorized vehicles, such as passenger vehicles or cargo vehicles, which are driven on public roadways. The yoke 12 is comprised of a plurality of modular sections 18 such that the yoke 12 can be disassembled. In this way the yoke 12 can be stored in a vehicle 20 when not in use.

The plurality of modular sections 18 includes a tee fitting 22 that has a first section 24 extending along a line that is oriented perpendicular to a longitudinal axis of a second section 26. The second section 26 has a first end 28 and a second end 30, and the first section 24 is centrally positioned between the first end 28 and the second end 30. The first section 24 has a distal end 32 with respect to the second section 26 and the distal end 32 is open.

A pair of curved members 34 is provided and each of the curved members 34 has a primary end 36 and a secondary end 38. Each of the curved members 34 is arcuate between the primary end 36 and the secondary end 38, and each of the curved members 34 has an outer surface 40. Moreover, the outer surface 40 of each of the curved members 34 is threaded adjacent to the primary end 36. The secondary end 38 of each of the curved members 34 is open and the primary end 36 of each of the curved members 34 is coupled to a respective one of the first end 28 or the second end 30 of the tee fitting 22. The secondary end 38 of each of the curved members 34 is spaced apart from each other such that the tee fitting 22 and the curved members 34 forms a U-shape when the curved members 34 are connected to the tee fitting 22.

Each of the arms 14 has a first end 42 and a second end 44, and each of the arms 14 has an outside surface 46. The outside surface 46 of each of the arms 14 is threaded adjacent to the first end 42 of the arms 14. The first end 42 of each of the arms 14 is insertable into the secondary end 38 of a respective one of the curved members 34 having the outside surface 46 of each of the arms 14 threadably engaging the respective curved member 34 for removably retaining the arms 14 in the curved members 34. Each of the arms 14 extends along a line that is oriented parallel to each other when the arms 14 are attached to the curved members 34. In this way the vehicle tire 16 can be positioned between each of the arms 14. The pair of arms 14 are spaced apart from each other a distance that is less than a diameter of the vehicle tire 16.

A first handle 48 is removably attachable to the yoke 12 such that the first handle 48 can be manipulated by a user 50. Moreover, the first handle 48 angles upwardly from the yoke 12 when the first handle 48 is removably attached to the yoke 12. In this way the first handle 48 enhances the user's 50 ability to urge the first handle 48 downwardly thereby facilitating the yoke 12 to lift the vehicle tire 16. The first handle 48 has a coupled end 52 and a free end 54, and the first handle 48 has an outer surface 55. The outer surface 55 of the first handle 48 is threaded adjacent to the coupled end 52 and the coupled end 52 of the first handle 48 is insertable into the distal end 32 of the first section 24 of the tee fitting 22. Additionally, the outer surface 55 of the first handle 48 threadably engages the first section 24 for removably retaining the first handle 48 in the tee fitting 22. A first grip 56 is positioned around the first handle 48 and the first grip 56 extends from the free end 54 toward the coupled end 52. The first grip 56 is comprised of a resiliently compressible material to enhance the user's 50 ability to grip the first grip 56.

A second handle 58 is removably attachable to the yoke 12 such that the second handle 58 can be manipulated by a user 50. The second handle 58 angles upwardly from the yoke 12 when the second handle 58 is removably attached to the yoke 12. In this way the second handle 58 can be urged downwardly by the user 50 thereby facilitating the yoke 12 to lift the vehicle tire 16. Additionally, the second handle 58 has a length that is less than a length of the first handle 48. In this way either the first handle 48 or the second handle 58 can be employed depending upon the weight of the vehicle tire 16 or the preference of the user 50.

The second handle 58 has a coupled end 60 and a free end 62, and the second handle 58 has an outer surface 64. The outer surface 64 of the second handle 58 is threaded adjacent to the coupled end 60 of the second handle 58. Additionally, the coupled end 60 of the second handle 58 is insertable into the distal end 32 of the first section 24 of the tee fitting 22 having the outer surface 64 of the second handle 58 threadably engaging the first section 24. In this way the second handle 58 is removably retained in the second handle 58 in the tee fitting 22. A second grip 66 is positioned around the second handle 58 and the second grip 66 extends from the free end 62 of the second handle 58 toward the coupled end 60 of the second handle 58. The second grip 66 is comprised of a resiliently compressible material to enhance the user's 50 ability to grip the second grip 66.

In use, the yoke 12 is assembled and either the first handle 48 or the second handle 58 is attached to the yoke 12, depending on the user's 50 preference. The yoke 12 is laid on the ground and the vehicle tire 16 is positioned on the yoke 12. Either the first handle 48 or the second handle 58, depending upon which is attached to the yoke 12, is urged downwardly thereby facilitating the yoke 12 to lift the vehicle tire 16. In this way the vehicle tire 16 can be lifted for mounting on the vehicle 20 when the vehicle 20 experiences a flat tire 16. The yoke 12 is subsequently disassembled to facilitate the yoke 12, the first handle 48 and the second handle 58 to be stored in the vehicle 20.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A modular tire lifting assembly for lifting a tire into position for mounting on a vehicle, said assembly comprising:

a yoke having a pair of arms being spaced apart from each other wherein said yoke is configured to have a vehicle tire positioned between said pair of arms, said yoke being comprised of a plurality of modular sections such that said yoke can be disassembled wherein said yoke is configured to be stored in a vehicle when not in use, said plurality of modular sections including a tee fitting having a first section extending along a line being oriented perpendicular to a longitudinal axis of a second section, said second section having a first end and a second end, said first section being centrally positioned between said first end and said second end, said first section having a distal end with respect to said second section, said distal end being open, and a pair of curved members, each of said curved members having a primary end and a secondary end, each of said curved members being arcuate between said primary end and said secondary end, said secondary end of each of said curved members being open, said primary end of each of said curved members being coupled to a respective one of said first end of said second section of said tee fitting and said second end of said second section of said tee fitting;

a first handle being removably attachable to said yoke wherein said first handle is configured to be manipulated by a user, said first handle angling upwardly from said yoke when said first handle is removably attached to said yoke wherein said first handle is configured to be urged downwardly by the user thereby facilitating said yoke to lift the vehicle tire;

a second handle being removably attachable to said yoke wherein said second handle is configured to be manipulated by a user and is interchangeable with said first handle, said second handle angling upwardly from said yoke when said second handle is removably attached to said yoke wherein said second handle is configured to be urged downwardly by the user thereby facilitating said yoke to lift the vehicle tire, said second handle having a length being less than a length of said first handle; and said second section of said tee fitting having an outer diameter greater than an outer diameter of either of said curved members whereby said yoke is pivotable on said tee fitting when an attached one of said first handle and said second handle is manipulated to lift the vehicle tire.

2. The assembly according to claim 1, wherein said secondary end of each of said curved members is spaced apart from each other such that said tee fitting and said curved members forms a U-shape when said curved members are connected to said tee fitting.

3. The assembly according to claim 1, wherein each of said arms has a first end and a second end, each of said arms having an outside surface, said outside surface of each of said arms being threaded adjacent to said first end of said arms, said first end of each of said arms being insertable into said secondary end of a respective one of said curved members having said outside surface of each of said arms threadably engaging said respective curved member for removably retaining said arms in said curved members.

4. The assembly according to claim 3, wherein each of said arms extends along a line being oriented parallel to each other when said arms are attached to said curved members wherein each of said arms is configured to have the vehicle tire being positioned therebetween.

5. The assembly according to claim 4, wherein said pair of arms is spaced apart from each other a distance being less than a diameter of the vehicle tire.

6. The assembly according to claim 1, wherein said first handle has a coupled end and a free end, said first handle having an outer surface, said outer surface of said first handle being threaded adjacent to said coupled end, said coupled end of said first handle being insertable into said distal end of said first section of said tee fitting having said outer surface of said first handle threadably engaging said first section for removably retaining said first handle in said tee fitting.

7. The assembly according to claim 6, further comprising a first grip being positioned around said first handle, said first grip extending from said free end toward said coupled end, said first grip being comprised of a resiliently compressible material wherein said first grip is configured to enhance the user's ability to grip said first grip.

8. The assembly according to claim 1, wherein said second handle has a coupled end and a free end, said second handle having an outer surface, said outer surface of said second handle being threaded adjacent to said coupled end of said second handle, said coupled end of said second handle being insertable into said distal end of said first section of said tee fitting having said outer surface of said second handle threadably engaging said first section for removably retaining said second handle in said tee fitting.

9. The assembly according to claim 8, further comprising a second grip being positioned around said second handle, said second grip extending from said free end of said second handle toward said coupled end of said second handle, said second grip being comprised of a resiliently compressible material wherein said second grip is configured to enhance the user's ability to grip said second grip.

10. A modular tire lifting assembly for lifting a tire into position for mounting on a vehicle, said assembly comprising:

a yoke having a pair of arms being spaced apart from each other wherein said yoke is configured to have a vehicle tire positioned between said pair of arms, said yoke being comprised of a plurality of modular sections such that said yoke can be disassembled wherein said yoke is configured to be stored in a vehicle when not in use, said plurality of modular sections including:

a tee fitting having a first section extending along a line being oriented perpendicular to a longitudinal axis of a second section, said second section having a first end and a second end, each of said first end and said second end being open, said first section being centrally positioned between said first end and said second end, said first section having a distal end with respect to said second section, said distal end being open;

a pair of curved members, each of said curved members having a primary end and a secondary end, each of said curved members being arcuate between said primary end and said secondary end, each of said curved members having an outer surface, said secondary end of each of said curved members being open, said primary end of each of said curved members being coupled to a respective one of said first end of said second section of said tee fitting and said second end of said second section of said tee fitting, said secondary end of each of said curved members being spaced apart from each other such that said tee fitting and said curved members forms a U-shape when said curved members are connected to said tee fitting; and each of said arms having a first end and a second end, each of said arms having an outside surface, said outside surface of each of said arms being threaded adjacent to said first end of said arms, said first end of each of said arms being insertable into said secondary end of a respective one of said curved members having said outside surface of each of said arms threadably engaging said respective curved member for removably retaining said arms in said curved members, each of said arms extending along a line being oriented parallel to each other when said arms are attached to said curved members wherein each of said arms is configured to have the vehicle tire being positioned therebetween, said pair of arms being spaced apart from each other a distance being less than a diameter of the vehicle tire; and a first handle being removably attachable to said yoke wherein said first handle is configured to be manipulated by a user, said first handle angling upwardly from said yoke when said first handle is removably attached to said yoke wherein said first handle is configured to be urged downwardly by the user thereby facilitating said yoke to lift the vehicle tire, said first handle having a coupled end and a free end, said first handle having an outer surface, said outer surface of said first handle being threaded adjacent to said coupled end, said coupled end of said first handle being insertable into said distal end of said first section of said tee fitting having said outer surface of said first handle threadably engaging said first section for removably retaining said first handle in said tee fitting;

a first grip being positioned around said first handle, said first grip extending from said free end toward said coupled end, said first grip being comprised of a resiliently compressible material wherein said first grip is configured to enhance the user's ability to grip said first grip;

a second handle being removably attachable to said yoke wherein said second handle is configured to be manipulated by a user and is interchangeable with said first handle, said second handle angling upwardly from said yoke when said second handle is removably attached to said yoke wherein said second handle is configured to be urged downwardly by the user thereby facilitating said yoke to lift the vehicle tire, said second handle having a length being less than a length of said first handle, said second handle having a coupled end and a free end, said second handle having an outer surface, said outer surface of said second handle being threaded adjacent to said coupled end of said second handle, said coupled end of said second handle being insertable into said distal end of said first section of said tee fitting having said outer surface of said second handle threadably engaging said first section for removably retaining said second handle in said tee fitting;

a second grip being positioned around said second handle, said second grip extending from said free end of said second handle toward said coupled end of said second handle, said second grip being comprised of a resiliently compressible material wherein said second grip is configured to enhance the user's ability to grip said second grip; and said second section of said tee fitting having an outer diameter greater than an outer diameter of either of said curved members whereby said yoke is pivotable on said tee fitting when an attached one of said first handle and said second handle is manipulated to lift the vehicle tire.

\* \* \* \* \*